(12) United States Patent
Schiller (10) Patent No.: US 11,297,255 B1
(45) Date of Patent: Apr. 5, 2022

(54) ON-BOARD LIGHT SOURCE CALIBRATION

(71) Applicant: Raytheon Company, Waltham, MA (US)

(72) Inventor: Stephen J. Schiller, Waltham, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/024,901

(22) Filed: Sep. 18, 2020

(51) Int. Cl.
| | |
|---|---|
| *H04N 5/235* | (2006.01) |
| *G06T 7/80* | (2017.01) |
| *G03B 7/00* | (2021.01) |
| *B64G 1/66* | (2006.01) |
| *G02B 17/06* | (2006.01) |

(52) U.S. Cl.
CPC ............ *H04N 5/2354* (2013.01); *B64G 1/66* (2013.01); *G02B 17/0663* (2013.01); *G03B 7/00* (2013.01); *G06T 7/80* (2017.01); *G06T 2207/10032* (2013.01); *G06T 2207/10152* (2013.01); *G06T 2207/30181* (2013.01)

(58) Field of Classification Search
CPC .......... H04N 5/2354; G06T 7/80; B64G 1/66; G02B 17/06663; G03B 7/00
See application file for complete search history.

(56) References Cited

U.S. PATENT DOCUMENTS

| | | | |
|---|---|---|---|
| 1,992,233 | A | 2/1935 | Norwood |
| 5,371,358 | A | 12/1994 | Chang et al. |
| 5,835,267 | A | 11/1998 | Mason et al. |
| 7,132,648 | B2 | 11/2006 | Ratiff et al. |
| 8,158,929 | B2 * | 4/2012 | Schiller ................. G01J 5/0275 250/252.1 |

(Continued)

FOREIGN PATENT DOCUMENTS

WO       20080100693 A2      8/2008

OTHER PUBLICATIONS

D. L. Helder, S. Karki, R. Bhatt, E. Micijevic, D. Aaron and B. Jasinski, "Radiometric Calibration of the Landsat MSS Sensor Series," in IEEE Transactions on Geoscience and Remote Sensing, vol. 50, No. 6, pp. 2380-2399, Jun. 2012, doi: 10.1109/TGRS.2011.2171351.

(Continued)

*Primary Examiner* — Kathleen V Nguyen
(74) *Attorney, Agent, or Firm* — Burns & Levinson, LLP; Joseph M. Maraia (57) ABSTRACT

An example method includes recording dark images on an image sensor on-board an orbital vehicle during flight, which include a first image recorded before the orbital vehicle is over a predefined location on the Earth and a second image recorded after the orbital vehicle is over the predefined location; and recording third and fourth images on the image sensor during flight based on illumination from a light source that is on-board, with the third image being recorded before the orbital vehicle is over the predefined location and the fourth image being recorded after the orbital vehicle is over the predefined location. A fifth image is recorded on the image sensor during flight while the predefined location on the Earth is visible to the image sensor. The fifth image is based on light from a ground-based calibration system. The light source is calibrated during flight based on the five images.

20 Claims, 6 Drawing Sheets

(56) References Cited

U.S. PATENT DOCUMENTS

| | | | |
|---|---|---|---|
| 8,350,223 B2 | 1/2013 | Mintz et al. | |
| 8,507,843 B2* | 8/2013 | Silny | G01J 3/021 250/252.1 |
| 8,913,243 B2 | 12/2014 | Silny et al. | |
| 9,024,253 B2 | 5/2015 | De Ruyter | |
| 9,068,886 B2 | 6/2015 | Silny et al. | |
| 9,372,119 B2 | 6/2016 | Silny et al. | |
| 9,823,116 B2 | 11/2017 | Silny et al. | |
| 10,692,178 B2 | 6/2020 | Schiller | |
| 2009/0051910 A1 | 2/2009 | Imura | |
| 2014/0055785 A1 | 2/2014 | Silny et al. | |
| 2014/0058695 A1* | 2/2014 | Silny | G01J 1/08 702/104 |
| 2015/0062580 A1 | 3/2015 | Silny et al. | |
| 2019/0258899 A1 | 8/2019 | Coogan et al. | |
| 2019/0259135 A1 | 8/2019 | Schiller | |

OTHER PUBLICATIONS

Mishra, N.; Helder, D.; Angal, A.; Choi, J.; Xiong, X. Absolute Calibration of Optical Satellite Sensors Using Libya 4 Pseudo Invariant Calibration Site. Remote Sens. 2014, 6, 1327-1346.

Alonso, K.; Bachmann, M.; Burch, K.; Carmona, E.; Cerra, D.; de los Reyes, R.; Dietrich, D.; Heiden, U.; Hölderlin, A.; Ickes, J.; Knodt, U.; Krutz, D.; Lester, H.; Müller, R.; Pagnutti, M.; Reinartz, P.; Richter, R.; Ryan, R.; Sebastian, I.; Tegler, M. Data Products, Quality and Validation of the DLR Earth Sensing Imaging Spectrometer (DESIS). Sensors 2019, 19, 4471.

Dennis Helder et al., "Pseudo Invariant Calibration Sites (PICS): An overview of calibration methodologies". ISPRS Technical Commission I Symposium, Sustaining Land Imaging: UAVs to Satellite, (Denver, CO), Nov. 17, 2014. (2 pages).

Jeffrey G. Masek, "Landsat 9 Science Instrument Details". Nasa-Landsat Science, (3 pages) (last modified Sep. 17, 2020). Retrieved from: https://landsat.gsfc.nasa.gov/landsat-9/instruments/landsat-9-science-instrument-details/.

Markham, Brian L. et al., "Landsat Data Continuity Mission Calibration and Validation". Pecora 17, Nov. 18, 2008, (Denver, CO), pp. 1-7, (7 pages). Retrieved from: https://www.asprs.org/a/publications/proceedings/pecora17/0023.pdf.

Mishra, N. et al., "Continuous Calibration Improvement: Landsat 5 through Landsat 8". Published in Remote Sensing of Environment (RSE): vol. 185:Oct. 7-15, 2016, pp. 1-16, (16 pages). Retrieved from: https://www.ncbi.nlm.nih.gov/pmc/articles/PMC5810144/.

Biggar et al. Vicarious radiometric calibration of EO-1 sensors by reference to high-reflectance ground targets, IEEE Transactions on Geoscience and Remote Sensing, vol. 41, No. 6 (Jun. 2003), pp. 1174-1179.

International Preliminary Report on Patentability dated May 26, 2011 of PCT/US2008/052083 filed Jan. 25, 2008 (5 pages).

Bruegge, Carol J., et al., "Vicarious Calibration of Orbiting Carbon Observatorey-2," IEEE Transactions on Geoscience and Remote Sensing, IEEE, USA, vol. 57, No. 7, Jul. 1, 2019 (Jul. 1, 2019), pp. 5135-5145, XP011732040, ISSN: 0196-2892, DOI: 10.1109/TGRS.2019.2897068 [retrieved on Jun. 24, 2019].

Nieke Jens; et al., "Calibration methodology for the airborne dispersive pushbroom imaging spectrometer (APEX)," Proceedidngs of SPIE, vol. 5570, Nov. 4, 2004 (Nov. 4, 2004), pp. 445-452, XP055871870, 1000 20th St. Bellingham WA 98225-6705 USA ISSN: 0277-786X, DOI: 10.1117/12.566364, ISBN: 978-1-5106-4548-6.

Silny, John; et al., "Large format imaging spectrometers for future hyperspectral Landsat mission," Imaging Spectrometry SVI, SPIE, 1000 20th St., Bellingham WA 98225-6705 USA, vol. 8158, No. 1,Sep. 8, 2011 (Sep. 8, 2011), pp. 1-26, XP060017251, DOI: 10.111/12.893857 [retrieved on Jan. 1, 1901].

International Search Report and Written Opinion dated Dec. 21, 2021, International Application No. PCT/US2021/047142 filed Aug. 23, 2021 (16 pages).

* cited by examiner

ON-BOARD LIGHT SOURCE CALIBRATION

TECHNICAL FIELD

This specification describes examples of systems for calibrating, during flight, light sources that are on-board an orbital vehicle, such as a satellite.

BACKGROUND

A satellite is used to record images of the Earth. The satellite includes image sensors ("sensors") to capture images based on light reflected from the Earth. The sensors are calibrated prior to launch of the satellite. However, over time, the performance of the sensors may change. On-board calibration may be used to calibrate the sensors during orbit. For example, lamps may be included on the satellite and used to perform relative calibration of the sensors. Relative calibration includes detecting normalized changes in the radiometric performance of the sensors over time and attempting to compensate for those changes. The lamps are calibrated prior to launch of the satellite; however, the lamps are also subject to changes in operation following launch and during flight. Moreover, the lamps have not been used to perform absolute calibration of the sensors. Absolute calibration includes illuminating a sensor and converting an output digital number per sensor pixel into a representation of a physical phenomenon, such as radiance. An example of an absolute calibration system that is ground-based and not on-board, and that may be used to calibrate on-board satellite sensors during flight, is the specular array for radiometric calibration (SPARC) system described in U.S. Pat. No. 8,158,929 (Schiller). Calibration techniques that use radiometric reference standards not on-board are referred to as vicarious calibration methods or systems. Vicarious systems such as SPARC create the potential for establishing a radiometric traceability path from the ground reference to an on-board light source through the Earth imaging system.

SUMMARY

An example method is directed to calibrating a light source that is on-board an orbital vehicle during flight. The method includes the following operations: recording dark images on an image sensor on-board the orbital vehicle during flight, with the dark images including a first image recorded before the orbital vehicle is over a predefined location on the Earth and a second image recorded after the orbital vehicle is over the predefined location on the Earth; and recording a third image and a fourth image on the image sensor during flight based on illumination from the light source that is on-board the orbital vehicle, with the third image being recorded before the orbital vehicle is over the predefined location on the Earth and the fourth image being recorded after the orbital vehicle is over the predefined location on the Earth. A fifth image is recorded on the image sensor during flight while the predefined location on the Earth is visible to the image sensor. The fifth image is based on light from a ground-based calibration system. The light source is calibrated during flight based on the first image, the second image, the third image, the fourth image, and the fifth image. The method may include one or more of the following features, either alone or in combination.

The method may include generating a radiance map for a state of the light source based on the first image, the second image, the third image, the fourth image, and the fifth image. The method may include controlling operation of the light source to calibrate the image sensor. The orbital vehicle may include a shutter to open to the environment, and the light source and the image sensor may be behind the shutter.

Recording the dark images, the third and fourth images, and the fifth image may include the following operations, which may or may not be performed in the following order: closing the shutter to restrict environmental light from reaching the image sensor; recording the first image on the image sensor when the shutter is closed and the light source is off; turning the light source on to illuminate the image sensor when the shutter is closed; recording the third on the image sensors when the shutter is closed and the light source is illuminated; turning the light source off; opening the shutter to allow light from a ground-based calibration system to illuminate the image sensor; recording the fifth image on the image sensor based on the light from the ground-based calibration system; closing the shutter to restrict environmental light from reaching the image sensor; turning the light source on to illuminate the image sensor when the shutter is closed; recording the fourth image on the image sensor when the shutter is closed and the light source is illuminated; turning the light source off; and recording the second image on the image sensors when the shutter is closed and the light source is off.

The light source may be among multiple light sources such as LED-based lamps included on the orbital vehicle. Different combinations of the multiple light sources may define different states. The method may include performing calibration for different states that include the light source based on the first image, the second image, the third image, the fourth image, and the fifth image.

Operations to perform the calibration may include the following: obtaining a dark bias of the light source based on the first and second images; removing the dark bias from the third, fourth, and fifth images; performing a calibration analysis of the image sensor based on the fifth image having the dark bias removed to obtain gain coefficients for pixels in the sensor, where each gain coefficient is for converting a digital number for a pixel into a radiance value; determining average digital numbers for pixels in the image sensor based on the third and fourth images having the dark bias removed; and applying the gain coefficients to the average digital numbers. Applying the gain coefficients may include multiplying the gain coefficients by the average digital numbers.

The dark bias may include an average dark bias for multiple images. The method may include repeating the following operations for two or more different spectral bands of the light: recording the dark images on the image sensor on-board the orbital vehicle during flight, with the dark images including the first and second images; recording the third and fourth images during flight; recording the fifth image on the image sensor during flight while the orbital vehicle is over the predefined location on the Earth; and generating the radiance map.

The ground-based calibration system may include a plurality of spherical mirrors disposed upon a uniform background as at least one array of reflective points, with at least two points of the array reflecting an intensity of directly incident sunlight.

An example system on an orbital vehicle may include an image sensor for capturing images based on incident light; a light source to illuminate the image sensor; a shutter that is controllable to allow environmental light to reach the image sensor to prevent the environmental light from reaching the image sensor; and a control system. The control system may be configured—for example, programmed, constructed, and/or arranged—to perform operations that include the following: controlling the shutter to record dark images on the image sensor on-board the orbital vehicle during flight, with the dark images including a first image recorded before the orbital vehicle is over a predefined location on the Earth and a second image recorded after the orbital vehicle is over the predefined location on the Earth; and controlling the shutter to record a third image and a fourth image on the image sensor during flight based on illumination from the light source that is on-board the orbital vehicle, with the third image being recorded before the orbital vehicle is over the predefined location on the Earth and the fourth image being recorded after the orbital vehicle is over the predefined location on the Earth. The control system may be configured also to perform operations that include controlling the shutter to record a fifth image on the image sensor during flight while the predefined location on the Earth is visible to the image sensor, with the fifth image being based on light from a ground-based calibration system; and calibrating the light source during flight based on the first image, the second image, the third image, the fourth image, and the fifth image. The example system may include one or more of the following features, either alone or in combination.

The control system may be configured also to perform operations that include generating a radiance map for a state of the light source based on the first image, the second image, the third image, the fourth image, and the fifth image. Operation of the light source may be controlled to calibrate the image sensor. The orbital vehicle may include a shutter to open to the environment, and the light source and the image sensor are behind the shutter.

Recording the dark images, the third and fourth images, and the fifth image may include the following operations, which may or may not be performed in the following order: controlling the shutter to close to restrict environmental light from reaching the image sensor; recording the first image on the image sensor when the shutter is closed and the light source is off; turning the light source on to illuminate the image sensor when the shutter is closed; recording the third on the image sensors when the shutter is closed and the light source is illuminated; turning the light source off; controlling the shutter to open to allow light from a ground-based calibration system to illuminate the image sensor; recording the fifth image on the image sensor based on the light from the ground-based calibration system; controlling the shutter to close to restrict environmental light from reaching the image sensor; turning the light source on to illuminate the image sensor when the shutter is closed; recording the fourth image on the image sensor when the shutter is closed and the light source is illuminated turning the light source off; and recording the second image on the image sensors when the shutter is closed and the light source is off.

The light source may be one or more among multiple light sources included on the orbital vehicle, where different combinations of the multiple light sources define different states. Operations performed by the control system may include performing the calibration for different states that include the light source based on the first image, the second image, the third image, the fourth image, and the fifth image.

Calibrating the light source may include the following operations: obtaining a dark bias of the light source based on the first and second images; removing the dark bias from the third, fourth, and fifth images; performing a calibration analysis of the sensor based on the fifth image having the dark bias removed to obtain gain coefficients for pixels in the sensor, where each gain coefficient is for converting a digital number for a pixel into a radiance value; determining average digital numbers for pixels in the sensor based on the third and fourth images having the dark bias removed; and applying the gain coefficients to the average digital numbers. Applying the gain coefficient may include multiplying the gain coefficients by the average digital numbers.

The dark bias may include an average dark bias for multiple images. The control system may be configured to repeat the following operations for two or more different spectral bands of the light: recording the dark images on the image sensor on-board the orbital vehicle during flight, with the dark images including the first and second images; recording the third and fourth images during flight; recording the fifth image on the image sensor during flight while the orbital vehicle is over the predefined location on the Earth; and generating the radiance map.

The ground-based calibration system may include a plurality of spherical mirrors disposed upon a uniform background as at least one array of reflective points, with at least two points of the array reflecting an intensity of directly incident sunlight.

Any two or more of the features described in this specification, including in this summary section, may be combined to form implementations not specifically described in this specification.

At least part of the systems and processes described in this specification may be configured or controlled by executing, on one or more processing devices, instructions that are stored on one or more non-transitory machine-readable storage media. Examples of non-transitory machine-readable storage media include read-only memory, an optical disk drive, memory disk drive, and random access memory. At least part of the systems and processes described in this specification may be configured or controlled using a computing system comprised of one or more processing devices and memory storing instructions that are executable by the one or more processing devices to perform various control operations including control over satellite operations.

The details of one or more implementations are set forth in the accompanying drawings and the following description. Other features and advantages will be apparent from the description and drawings, and from the claims.

DETAILED DESCRIPTION

Described herein are example systems and processes for calibrating, during flight, light sources that are on-board an orbital vehicle. A satellite is used as an example orbital vehicle in the following description; however, the systems and processes are not limited to use with satellites. The light sources, which may be lamps, light-emitting diodes (LEDs), or any other appropriate source of illumination, are configured to calibrate image sensors ("sensors") on a satellite. The sensors are configured to capture images of the Earth from light reflected from the Earth.

In this regard, during imaging, the satellite orbits the Earth. Each orbit is referred to as a path and may run in the north-south direction. Images from the orbit are captured by a detector focal plane array included on the sensors. Examples of sensor arrays that have been and may be used on satellites utilizing on-board calibration light source assemblies include, but are not limited to, the NASA EO-1 Advanced Land Imager (ALI), the MultiSpectral Scanner (MSS) system, the Thematic Mapper (TM) and the Operational Land Imager (OLI). Each successive orbit of the satellite may capture images from a different part of the Earth, resulting in individual segmented images of the Earth being recorded by row (east-west) and path (north-south) coordinates. There are two primary types of satellite image sensors, which are defined in terms of how they scan: along-track (or "push-broom") sensors and across-track (or "whisk-broom") sensors. Example sensor designs have a spatial resolution of 30 meters (m).

Raw images captured by the sensors may be characterized as pixel digital numbers (DNs) that are proportional to the scene irradiance illuminating the focal plane through an optical system. The example image calibration process described herein converts the DNs to radiance units based on gain coefficients characterized by the on-board calibration system that can include light sources. The light source illumination may be produced by heated filaments or LEDs. LEDs may consume less power and may provide a better representation of the shape of the solar spectrum.

The sensors may be calibrated during flight using a ground-based calibration system. An example of a ground-based calibration system that may be used to calibrate the on-board satellite sensors during flight is the SPARC system described in U.S. Pat. No. 8,158,929 (Schiller), which is incorporated herein by reference. As noted, the SPARC system enables absolute calibration of the sensors, in which an output DN from a sensor pixel is converted into a representation of a physical phenomenon, such as radiance in this example. The expected radiance values output by the SPARC system may be compared to the on-board calibrator-derived radiance values detected by the sensors and the sensor output values may be adjusted to account for any difference between the two.

In some situations, ground-based vicarious solar calibration may not be available to the satellite. For example, ground-based SPARC targets or other vicarious targets such as pseudo invariant sites (PICS) may be out of view due to the position of the satellite, clouds, or the time of day—for example, it may be night. The on-board light sources therefore may be used to calibrate the sensors. In this regard, as noted, the on-board light sources are calibrated prior to launch of the satellite; however, the light sources are also subject to change in operation following launch and during flight. Accordingly, the light sources may also be calibrated during flight to account for any changes in operation that occurred following launch. The light sources may be recalibrated using the ground-based calibration system when the ground-based calibration system is visible. And later, such as when the ground-based calibration system is not available, the light sources may be used to calibrate the sensors at a higher temporal frequency than possible by vicarious methods. That is, the light sources become a references of known radiance illumination to determine if the sensors are changing as the satellite orbits the Earth, including in areas where ground-based calibration is not available. The calibration performed using the light sources may be absolute, thus making absolute calibration available any time during flight. Furthermore, the light sources may be smaller than other types of on-board calibration systems, such as solar diffusers. And, unlike solar diffusers, the light sources do not rely on sunlight or require repositioning of the satellite toward the sun, which can reduce imaging time.

An example satellite system, which is described in more detail below, performs operations during flight—for example, while orbiting the Earth—that include the following. Dark images are recorded on an image sensor on-board the satellite during flight. The dark images include a first image recorded before the satellite is over a predefined location on the Earth, such as a location on the Earth where SPARC targets are visible to the satellite's image sensor ("SPARC location"), and a second image recorded after the satellite is over the SPARC location. Light source images are recorded on the image sensor on-board the satellite during flight. The light source images include a third image and a fourth image that are recorded on the image sensor during flight based on illumination from the light source that is on-board the satellite. The third image is recorded before the satellite is over the SPARC location and the fourth image recorded after the satellite was over the SPARC location. A fifth image, nested temporally between the pair of dark and light source images, is recorded on the image sensor during flight while the SPARC targets are visible. The fifth image includes the light from the SPARC targets. Gain coefficients are generated based on the first through fifth images to calibrate the light source during flight, as described below.

Figure 1:
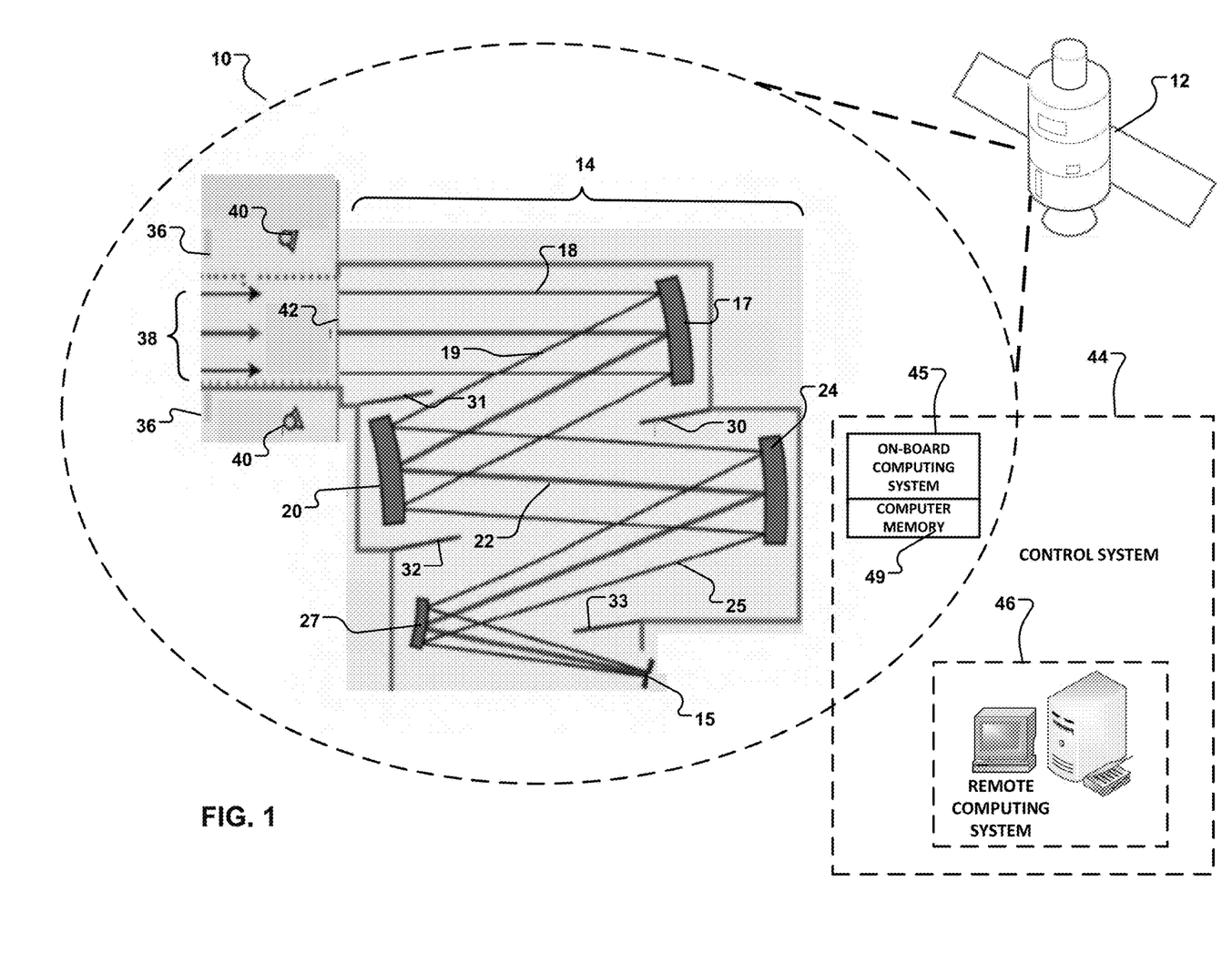
FIG. 1 is a diagram of an example satellite and its control system, including an exploded view of sensor system components contained in the satellite.

An example system 10 that may be included on a satellite 12 is shown in FIG. 1. All components of the satellite on which system 10 resides are not shown. System 10 includes a telescope subsystem 14 for directing light toward a sensor array 15 that includes multiple spectral image sensors. In this example, telescope subsystem 14 includes a first (or primary) mirror 17 to receive light 18 from an object such as the surface of the Earth and to reflect light 18 to produce first reflected light 19. A second (or secondary) mirror 20 receives and reflects the first reflected light 18 to produce second reflected light 22. A third (or tertiary) mirror 24 receives and reflects the second reflected light 22 to produce third reflected light 25. A fourth (or quaternary) mirror 27 receives and reflects the third reflected light 25 towards a focal plane assembly containing the sensor array 15. In some implementations, first mirror 17 includes a reflective surface that is at least partly or wholly a zero or low optical power surface; second mirror 20 includes a reflective surface that is at least partly or wholly a zero or low optical power surface; third mirror 24 includes a reflective surface that is at least partly or wholly a positive optical power surface; and fourth mirror 27 includes a reflective surface that is at least partly or wholly a positive optical power surface. Optical power is the degree to which a mirror converges or diverges reflected light. Mirrors that diverge light have negative optical power and mirrors that converge light have positive optical power. Baffles 30, 31, 32, and 33 may protect the mirrors from stray light reflections. Telescope subsystem 14 is not limited to the optical configuration show in FIG. 1 and may employ additional or different optical components.

System 10 includes a shutter 36 that is controllable to open to allow light 38 from the environment to enter telescope subsystem 14 or to close to prevent light 38 from the environment from entering telescope subsystem 14. In some implementations, shutter 36 may be an opaque mechanical structure that is movable into or out of the path of light 38 from the environment. Light from the environment may include any light from outside the satellite, such as light from the Sun, the stars, the Earth, or other satellites. As shown in FIG. 1, light sources 40 are located behind shutter 36 on satellite 12.

As noted, the light sources may be lamps, light-emitting diodes (LEDs), or any other controllable source of illumination. The light sources are configured, arranged, and controllable to shine light through aperture 42 of telescope subsystem 14, which directs the light to sensor array 15 as shown conceptually in FIG. 1. In some implementations, light sources 40 include twelve (12) computer-controllable lamps, although only two are shown. The lamps are controllable in multiple states. A state includes different combinations of lamps. For example, for lamps numbered one to twelve, a first state may include illuminating lamps one, two, and three while the remaining lamps are off; a second state may include illuminating lamps four, five, six, and ten while the remaining lamps are off; and a third state may include illuminating lamps one, four, and twelve, while the remaining lamps are off; and so forth. In some implementations, the lamps are controllable in groups of three, where three "on" lamps defines a state; however, that is not a requirement. The lamps are configured to illuminate the sensor array over multiple non-thermal spectral bands, e.g., wavelengths of light. In some implementations, different lamps may be configured and controllable to illuminate over a limited range of spectral bands. In some implementations, different lamps may be configured and controllable to illuminate over all visible spectral bands.

Operation of satellite 12 is controlled using a control system 44. Among other things, control system 44 controls operation of shutter 36—for example to open or to close the shutter, and operation of the light sources—for example, to turn selected light sources on or off and/or to control their illumination levels in some examples. Control system is also configured to perform on-board calibration of the sensor array and of light sources using the example techniques described herein.

Control system 44 may include circuitry and/or an on-board computing system 45 to control operations of the satellite. The circuitry or on-board computing system is "on-board" in the sense that it is located on the satellite itself. On-board computing system 45 may include, for example, one or more microcontrollers, one or more microprocessors, programmable logic such as a field-programmable gate array (FPGA), one or application-specific integrated circuits (ASICs), solid state circuitry, or any appropriate combination of two or more of these types of processing devices.

In some implementations, on-board components of control system 44 may communicate with a remote computing system 46, which may be part of the control system. This computing system is remote in the sense that it is not located on the satellite itself. For example, control system 44 can also include computing resources distributed to a remote location—for example, part of ground operations at one or more ground locations—at least a portion of which is not on-board the satellite. Commands provide by the remote computing system may be transferred for execution by the on-board computing system. In some implementations, control system 44 includes only on-board components. In some implementations, control system 44 includes a combination of on-board components and the remote computing system. In some implementations, control system 44 may be configured—for example programmed—to implement control functions based at least in part on input from a person.

Figure 2:
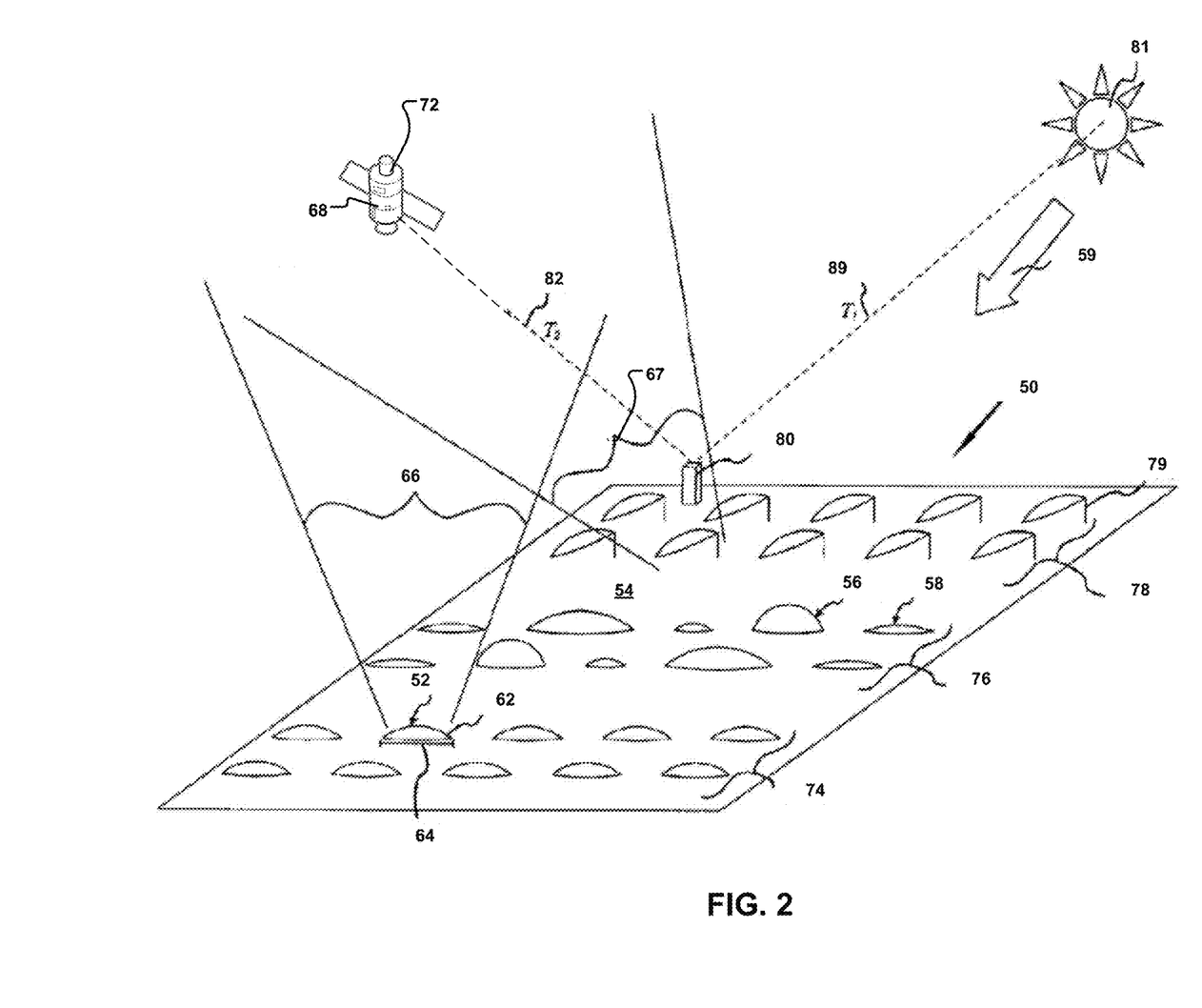
FIG. 2 is a block diagram of an example specular array for radiometric calibration (SPARC) system containing convex mirrors having differing radii of curvature, differing geometric patterns of mirror arrays, and a satellite positioned relative thereto.

The light 38 from the environment that reaches sensor array 15 may include light reflected from the Earth, including light reflected from SPARC targets arranged on the Earth. In this regard, the SPARC system is described, in part, as follows in U.S. Pat. No. 8,158,929 (Schiller). FIG. 2 conceptually illustrates a perspective view of an example SPARC system (or simply "SPARC"). SPARC 50 includes spherical mirrors, of which mirror 52 is an example, disposed upon a uniform low reflectance background 54 so as to provide an array of reflective points on the ground. In example implementations, the background is an asphalt pavement or a substantially uniform grassy area. At least two points, e.g., mirrors 56 and 58, reflect different intensities of directly incident sunlight 59 due to their different radii of curvature. Intensities may also be selected by combining different numbers of mirrors into a single target.

Each mirror, such as mirror 52, has a radius of curvature 62 and a diameter 64. The radius of curvature 62 and the diameter 64 provide a field of regard 66. Collectively, all mirrors of SPARC 50 provide a collective minimum calibratability field of regard. The field of regard represents the solid angle of reflected light from the mirror in which the image of the sun is visible. When a sensor 68, which is part of a sensor array, is to be calibrated, for example when satellite 72 is within the minimum calibratability field of regard, calibration can occur using all features of the SPARC array. The mirrors of SPARC 50 may have different radii of curvature and diameter dimensions, and as such different individual fields of regard. In implementations in which all mirrors are collectively utilized for calibration, the collective minimum calibratability field of regard may be determined by the smallest field of regard produced by a member of the SPARC 50 array Each mirror 52 may be concave or convex, however, in some implementations, the mirrors 52 are all convex. As domed structures rising from the plane of the ground, the convex shape may have advantages over concave spherical mirrors such as, but not limited to, a reduced likelihood to collect rain, snow, leaves, or other debris that might adversely affect the reflective properties of the mirror. The convex mirror also produces a virtual image of the Sun, thereby avoiding the dangers of light concentration by concave mirrors.

In some implementations, the spherical mirrors are subgrouped. In an example, the SPARC system may include a first subgroup 74 and a second subgroup 76. In this example, the mirrors of first subgroup 74 are about identical as shown. Furthermore, as shown in second subgroup 76, in this example, at least two mirrors, such as mirrors 56 and 58, have different radii of curvature. Also, in second subgroup 76, in at least this example, at least two mirrors, such as mirrors 56 and 58, have different diameters. Generally, the mirrors of SPARC 50 each provide a point source target, as recorded by the satellite sensor array, which is collectively an array of reflective points. In some implementations, the mirrors of first subgroup 74 provide for calibration of spatial phasing and the mirrors of second subgroup 76 provide point sources of varying intensity to fully calibrate the dynamic ranges of the sensors.

In some implementations, SPARC 50 is structured and arranged to orient the field of regard 67 and therefore the collective minimum calibratability field of regard towards a sensor 68 be calibrated. This is shown in FIG. 1 by example subgroup 78. Such orientation may be achieved by raising one side of each mirror, such as by an adjustable or static foot in a single mirror or a panel of mirrors that is fitted with an actuator 79 structured and arranged to actuate the mirrors to dynamically orient the collective minimum calibratability field of regard towards a sensor 68 to be calibrated.

SPARC 50 may include at least one information gatherer 80 structured and arranged to gather atmospheric information. In some implementations, information gatherer 89 is a solar radiometer operable to determine transmittance (T1) of the atmosphere between the mirrors of SPARC 50 and the sun 81—indicated by dotted line 89, and used to calculate the transmittance (T2) of the atmosphere between the mirrors of SPARC 100 and sensor to be calibrated 58—indicated by dotted line 82.

In some implementations, information gatherer 80 also includes a sensor locator structured and arranged to determine the location of the sensor to be calibrated 68. The location information regarding the sensor may be provided in the metadata that comes from the sensor 68 system itself. Therefore, in an example, the element of the information gatherer 80 that determines the location of the sensor 68 is not so much truly determining the location as it is simply reading and interpreting the information provided directly by sensor 68. In an example, a separate sensor locator, such as radar or triangulation, may be employed. Such location and transmittance information may be used in determining the intensity of the reflected directly incident sunlight as provided to sensor 68 to be calibrated.

In SPARC 50, mirrors 52 advantageously provide "solar stars" at the ground site, which are seen by image sensor 68 as a virtual image of the sun produced by each mirror. The solar irradiance measured in watts-per-meter squared (watts/$m^2$) at the time of incidence is converted to an intensity source measured in watts-per-steradian (watt/sr) that illuminates any surface or sensor input aperture with an irradiance that follows the inverse square law. The intensities for each mirror 52 may be constant over all illumination and view angles making them versatile for multiple sensors, multiple view angles, and multiple atmospheric conditions. If a mirror has a radius of curvature that is precise, a uniform intensity is produced within a solid angle cone with an angular width determined by the diameter of the mirror's reflecting surface and the radius of curvature. As long as an overflying sensor can see the reflection of the sun, an effective radiance response can be determined and used for on-board sensor calibration.

In some implementations, calibration need not be performed with respect to a target on the Earth such as a SPARC target or PICS site. For example, in some implementations, the calibration target may be a celestial object imaged just above the Earth's limb or inserted into a deep space image. The celestial object may be any appropriate source such as the Moon or stars having a known absolute radiance or intensity at the time the target is imaged and the images described herein are collected.

Figure 3:
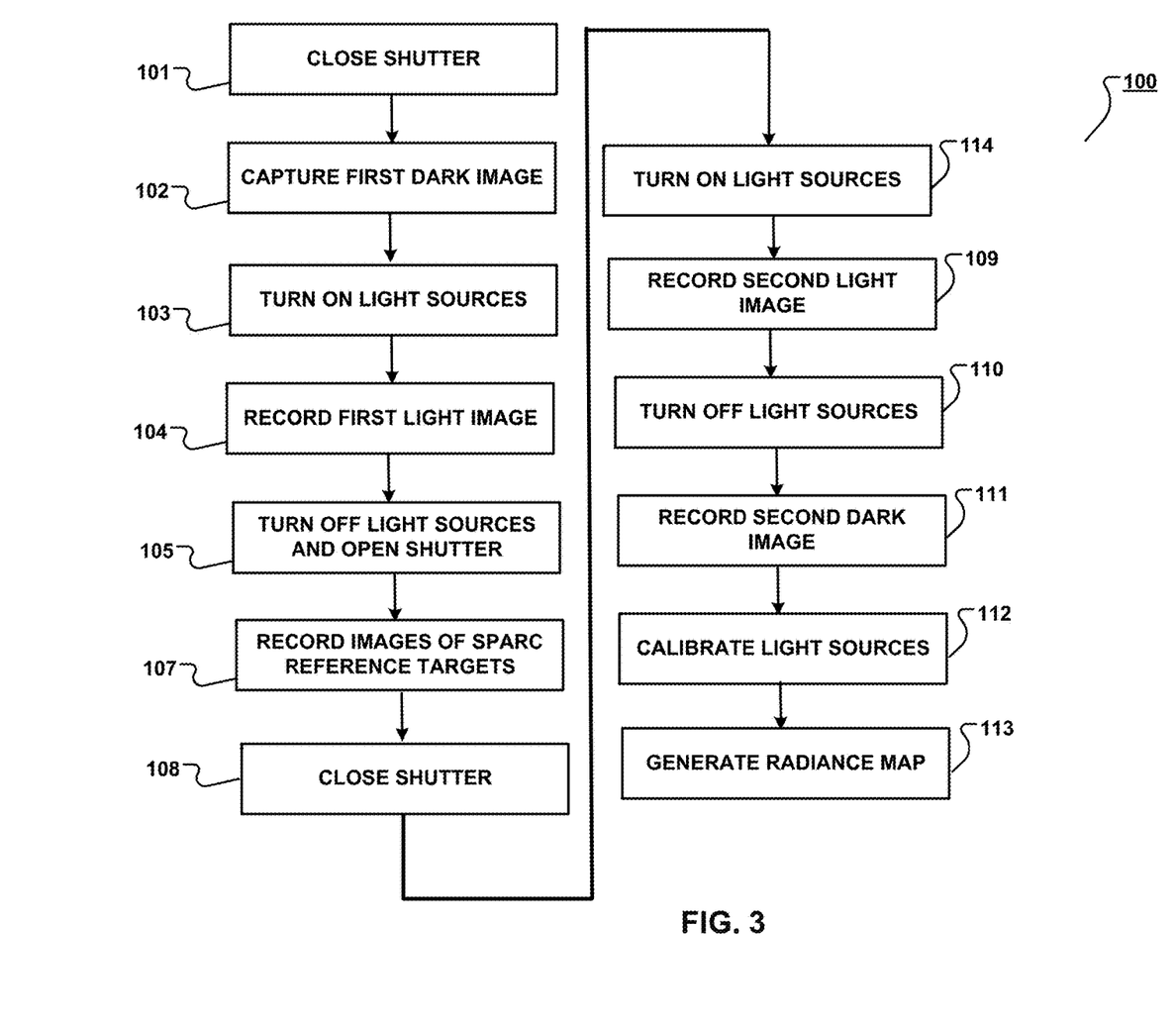
FIG. 3 is a flowchart showing an example process for calibrating light sources contained on the satellite of FIG. 1.

Referring to FIGS. 1 and 3, a process 100 is shown for calibrating light sources 40. Process 100 may be repeated for all or some states of the light sources. In addition, process 100 may be repeated for all or some wavelengths of light received at sensor array 15. Process 100 may be performed at least in part by, or controlled at least in part by, the control system 44 described herein.

Figure 4:
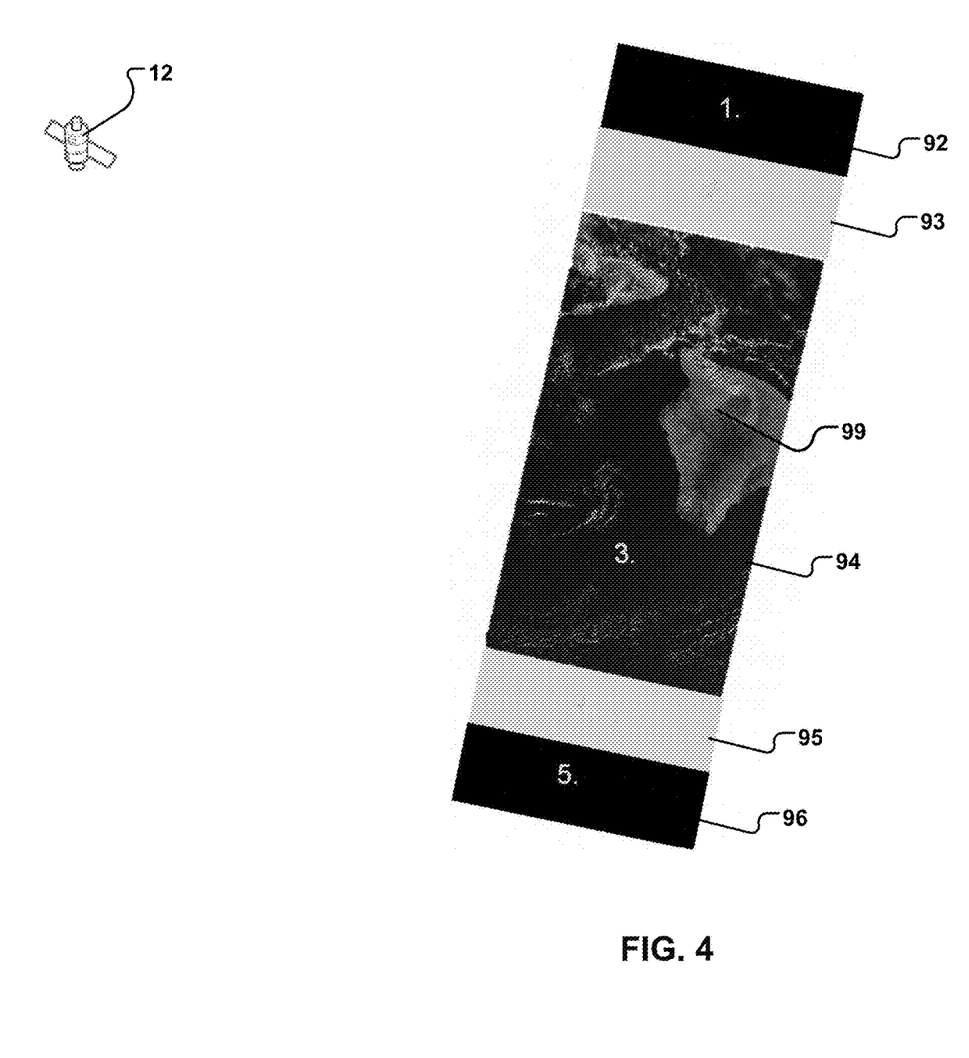
FIG. 4 is a top view of different types of images captured during satellite orbit, which are used in the example calibration process of FIG. 3.

In some implementations, process 100 is performed using SPARC targets located on Mauna Loa, Hi. 99 (FIG. 4). There, the SPARC targets are located at an elevation of over 10,000 feet (3048 meters), which means that they are above most cloud cover. In addition, in some examples where a satellite system only processes land imaging, satellite 12 operationally does not deliver imaging recorded over the ocean. In an example, there is 13 minutes of dead time over the ocean prior to reaching the SPARC targets and five minutes of dead time over the ocean after passing the SPARC targets. During this dead time, satellite 12 is configured not to perform imaging. Accordingly, these times when satellite 12 is over the ocean may be used to calibrate the light sources without disrupting imaging. In process 100, this time is referred to as "over-ocean" time, whereas times when the satellite is in position to image the SPARC targets are referred to as "over-target" time.

While satellite 12 is over-ocean, shutter 36 is closed (101) to restrict environmental light 38 from reaching sensor array 15. For example, closing shutter 36 may prevent light from the Earth, the Sun, and/or the stars from reaching sensor array 15. At this time, light sources 40 are turned-off (in which case, the light sources do not illuminate or go dark), also preventing light from the light sources from reaching the sensor array. While the satellite is over-ocean, shutter 36 is closed, and light sources 40 are off, a first dark image is recorded on sensor array 15. The image is referred to as a "dark image" because it is captured (102) while there is no illumination of, or minimal illumination of, image sensors in sensor array 15. Referring to FIG. 4, the first dark image (1) 92 may be stored in computer memory 49 on the satellite, for example. The dark image characterizes the readout bias for all the sensors.

While satellite 12 is over-ocean and shutter 36 is closed, one or more—for example, three—of the light sources are turned on (103). The combination of turned-on light sources is referred to as a state of the light sources, as explained above. Because the shutter remains closed, light from light sources 40 illuminates sensor array 15. In some examples, only light from light sources 40 illuminates sensor array 15 at this time. A first light source image is recorded (104) on sensor array 15 when shutter 36 is closed and light sources 40 are illuminated. This image is referred to as a "light source image" because it is an image solely or primarily of light from light sources 40. Referring to FIG. 4, the first light source image (2) 93 may be stored in computer memory 49 on the satellite, for example.

As satellite 12 proceeds along its orbital path, satellite 12 moves from over the ocean to over land—in this example, over land in view of the SPARC targets on Mauna Loa, Hi. 99. Prior to the satellite being over-target, light sources 40 are turned-off and shutter 36 is opened (105). In this configuration, light from the environment can enter telescope subsystem 14. Accordingly, in this configuration, while satellite 12 is over-target, light from the ground-based calibration system—in this example, the SPARC targets—is allowed to illuminate sensor array 15. Images—referred to as SPARC images—are recorded (106) on sensor array 15 based on light reflected form the SPARC targets. Referring to FIG. 4, one or more SPARC images (3) 94 may be stored in computer memory 49 on the satellite, for example.

As satellite 12 proceeds along its orbital path, the satellite moves from over land to over the ocean. Prior to or while the satellite is over-ocean, shutter 36 is closed (108) as above to restrict environmental light from reaching sensor array 15. As explained previously, closing shutter 36 may prevent environmental light from the Earth, the Sun, and the stars from reaching sensor array 15. At this time, light sources 40 are turned-on (114) to illuminate sensor array 15 when shutter 36 is closed (108). This results in the same configuration as described above. At this time, a second light source image is recorded (109) on sensor array 15. The second light source image, like the first light source image described previously, is an image solely or primarily based on light from a state of light sources 40. Referring to FIG. 4, the second light source image (4) 95 may be stored in computer memory 49 on the satellite, for example.

While the satellite is over-ocean and while shutter 36 is closed, light sources 40 (for example, all light sources) are turned off (110). While the satellite is over-ocean, shutter 36 is closed, and light sources 40 are off, a second dark image is recorded (111) on the image sensor. As noted, this dark image is captured while there is no illumination of, or minimal illumination of, image sensors in sensor array 15. Referring to FIG. 4, the second dark image (5) 96 may be stored in computer memory 49 on the satellite, for example.

Process 100 includes calibrating (112) the light sources based on the first and second dark images captured before and after land, the first and second light source images captured before and after land, and the images captured from the SPARC targets. Calibration may be performed for all, some, or one state of the light sources. A summary of an example calibration process that may be performed in operation 112 includes the following. A pair of light source DN values and dark image DN values are averaged for each spatial pixel to obtain by interpolation the DN light source and dark image response relative to the time of SPARC image collection. Subtracting the dark image from the light source image and performing a flat field correction creates the dark subtracted DN light source response image to be calibrated. An analysis of a SPARC image provides the DN per-unit-radiance gain coefficient that applies to all pixels in the dark subtracted light source image. Multiplying each pixel DN value in the dark subtracted light source image by the SPARC gain coefficient converts the light source DN image to a radiance image completing the calibration and generating a radiance map (113) produced by the light source at the focal plane. The radiance map includes radiance values for a given wavelength of light for each pixel in the sensor array illuminated by a state of the light sources. For example, there may be a one-to-one mapping of pixels to radiance values in the radiance map. It is assumed that the relative pixel non-uniformity correction (NUC) coefficients used to perform a flat field correction were determined independently prior to the start of process 100.

Figure 5:
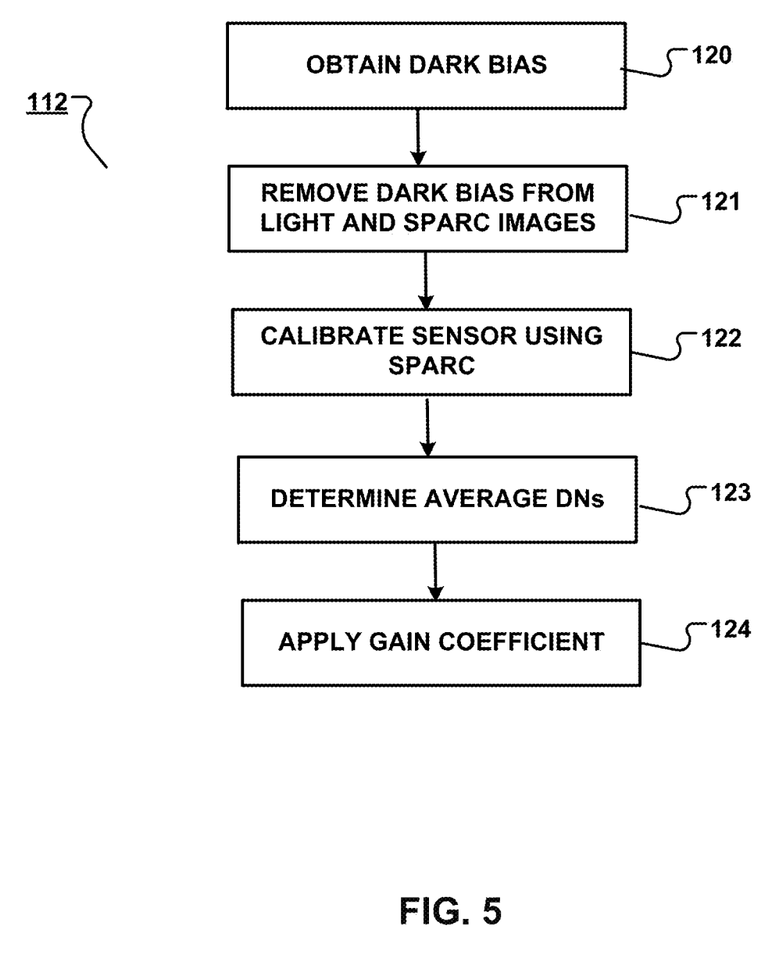
FIG. 5 is a flowchart showing example operational image calibration based on calibration coefficients generated using the operations included in the calibration process of FIG. 3.

Calibration (112) may be performed for each light sources state and wavelength as noted, although one state and wavelength is described in the following. Example calibration operations (112) are shown in FIG. 5. To perform a calibration, the dark bias of light sources 40 is obtained (120) based on the first and second dark images. The dark bias includes the amount of light that registers on sensor array 15 when no light or minimal light is applied to sensor array 15. Each image, including the dark images, from the sensors is defined by DNs, with each DN being produced by a single pixel on an image sensor. In this example, the dark bias may be obtained by averaging the DNs of the first and second dark images. In this example, the resulting dark bias is then removed (121) from the first and second light source images and from the images captured from the SPARC targets. Removing the dark bias may include subtracting the averaged DNs from the DNs for each of the other images. That is, subtracting may include subtracting the averaged DNs from the dark images from the DNs for each of the light source images and the DNs for the SPARC target images. This may be done for each light source state and wavelength. The flat field correction described previously may be performed on the resulting images.

A calibration analysis of sensor array 15 is performed (122) using the SPARC images having the dark bias removed to obtain gain coefficients for pixels in the sensors. The calibration analysis may be performed to identify a difference between an expected sensor output using known values from the SPARC targets and the actual sensor output. The gain coefficients account for this difference. For example, the gain coefficients may be applied to the DNs of each pixel to account for aberrations in the sensor operation. There may be one gain coefficient per pixel, which is used to convert a DN for that pixel into a radiance value that matches an expected radiance value.

Figure 6:
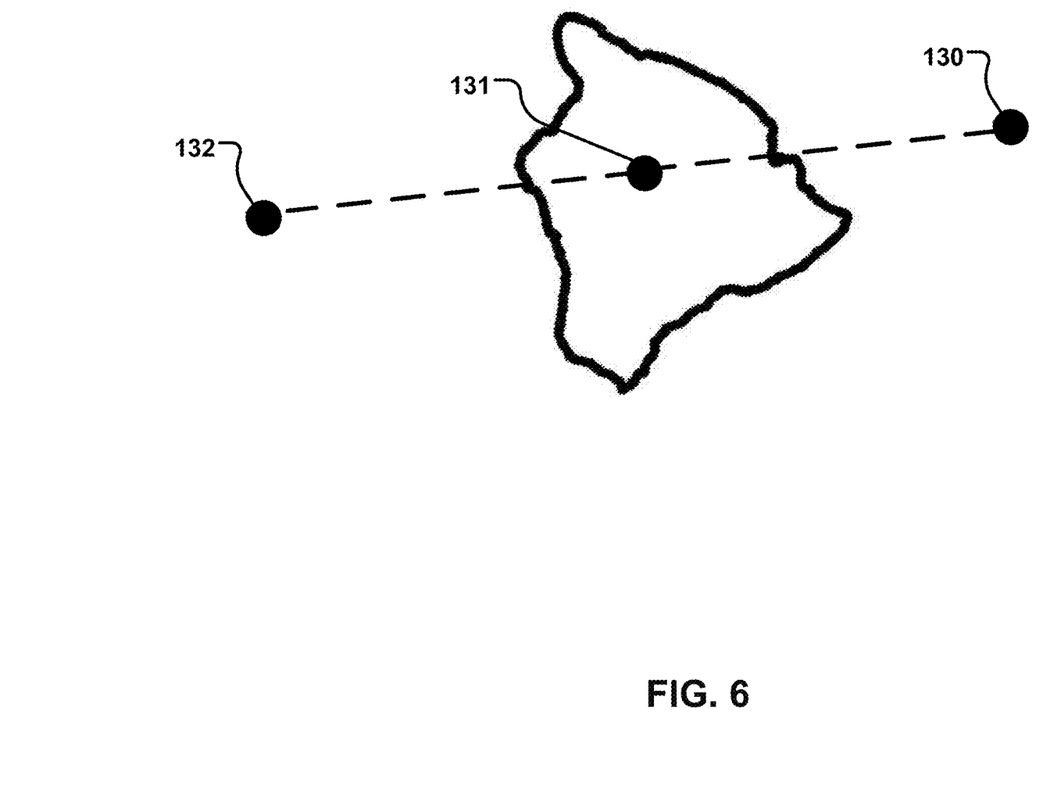
FIG. 6 is a top view showing satellite imaging over, and relative to, Hawaii, which is an example SPARC target location

Average DNs for pixels in each sensor of the sensor array are determined (123) based on the first and second light source images having the dark bias removed. For example, DNs for the light source images with the dark bias removed may be averaged so that the resulting average value coincides with the location at which images of the SPARC targets were captured. For example, referring to FIGS. 4 and 6, assume that the first light source image 92 is captured at location 130, the image(s) 94 of the SPARC targets are captured at location 131, and the second light source image 95 is captured at location 132. Locations 130 and 132 may be equidistant from location 131 at which image(s) 94 of the SPARC targets are captured. In this example, the DN for the first light source image is 2020 and the DN for the second light source image is 2000. The two DNs are averaged to produce an averaged DN of 2010. Because the location where the image of the SPARC targets is captured is mid-way between the locations where the light source images are captured, the average DN value of 2010 is assumed for the light sources at the location where the image of the SPARC targets is captured. To calibrate the on-board light source, the gain coefficient for each pixel determined using the SPARC targets above is applied (124) to the averaged DN for that pixel obtained using the first and second light source images with dark bias removed, as described above. Applying the gain coefficient may include multiplying the gain coefficients by the averaged DNs of individual pixels of the light source images. Absolute radiance maps for each state of the light sources may be generated using the products of the averaged DN values and the gain coefficients.

Although the systems and processes herein have been described in the context of a satellite, they may be used with any appropriate aerial or orbital vehicle that is configured to obtain images of the Earth or other celestial body that includes SPARC targets or other ground-based calibration systems.

All or part of the systems and processes described in this specification and their various modifications may be configured or controlled at least in part by one or more computers using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with configuring or controlling the systems and processes can be performed by one or more programmable processors executing one or more computer programs to control all or some of the well formation operations described previously. All or part of the systems and processes can be configured or controlled by special purpose logic circuitry, such as, an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Advantages of the example implementations described herein may include the ability to collect all needed image data for in-flight re-calibration of one or more on-board light source such as one or more lamps, as described herein, while almost simultaneously eliminating potential biases due to temporal drift in the sensor system's radiometric response between image collections that occur in standard Earth remote sensing concepts of operations (ConOps).

Other implementations not specifically described in this specification are also within the scope of the following claims.

What is claimed is:

1. A method of calibrating a light source that is on-board an orbital vehicle during flight, the method comprising:
    recording dark images on an image sensor on-board the orbital vehicle during flight, the dark images including a first image recorded before the orbital vehicle is over a predefined location on the Earth and a second image recorded after the orbital vehicle is over the predefined location on the Earth;
    recording a third image and a fourth image on the image sensor during flight based on illumination from the light source that is on-board the orbital vehicle, the third image being recorded before the orbital vehicle is over the predefined location on the Earth and the fourth image being recorded after the orbital vehicle is over the predefined location on the Earth;
    recording a fifth image on the image sensor during flight while the predefined location on the Earth is visible to the image sensor, the fifth image being based on light from a ground-based calibration system; and
    calibrating the light source during flight based on the first image, the second image, the third image, the fourth image, and the fifth image.

2. The method of claim 1, further comprising:
    generating a radiance map for a state of the light source based on the first image, the second image, the third image, the fourth image, and the fifth image.

3. The method of claim 1, further comprising:
    controlling operation of the light source to calibrate the image sensor.

4. The method of claim 1, wherein the orbital vehicle comprises a shutter to open to the environment and wherein the light source and the image sensor are behind the shutter; and
    wherein recording the dark images, the third and fourth images, and the fifth image comprises:
        closing the shutter to restrict environmental light from reaching the image sensor;
        recording the first image on the image sensor when the shutter is closed and the light source is off;
        turning the light source on to illuminate the image sensor when the shutter is closed;
        recording the third on the image sensors when the shutter is closed and the light source is illuminated;
        turning the light source off;
        opening the shutter to allow light from a ground-based calibration system to illuminate the image sensor;
        recording the fifth image on the image sensor based on the light from the ground-based calibration system;
        closing the shutter to restrict environmental light from reaching the image sensor;
        turning the light source on to illuminate the image sensor when the shutter is closed;
        recording the fourth image on the image sensor when the shutter is closed and the light source is illuminated;
        turning the light source off; and
        recording the second image on the image sensors when the shutter is closed and the light source is off.

5. The method of claim 1, wherein the light source is among multiple light sources included on the orbital vehicle, where different combinations of the multiple light sources comprise different states; and
    wherein the method comprises performing the calibrating for different states that include the light source based on the first image, the second image, the third image, the fourth image, and the fifth image.

6. The method of claim 1, wherein calibrating comprises:
    obtaining a dark bias of the light source based on the first and second images;
    removing the dark bias from the third, fourth, and fifth images;
    performing a calibration analysis of the image sensor based on the fifth image having the dark bias removed to obtain gain coefficients for pixels in the sensor, each gain coefficient for converting a digital number for a pixel into a radiance value;

determining average digital numbers for pixels in the image sensor based on the third and fourth images having the dark bias removed; and applying the gain coefficients to the average digital numbers.

7. The method of claim 6, wherein applying comprises multiplying the gain coefficients by the average digital numbers.

8. The method of claim 1, wherein the dark bias comprises an average dark bias for multiple images.

9. The method of claim 1, further comprising, repeating the following operations for two or more different spectral bands of the light:

recording the dark images on the image sensor on-board the orbital vehicle during flight, the dark images including the first and second images;

recording the third and fourth images during flight;

recording the fifth image on the image sensor during flight while the orbital vehicle is over the predefined location on the Earth; and generating the radiance map.

10. The method of claim 1, wherein the ground-based calibration system comprises a plurality of spherical mirrors disposed upon a uniform background as at least one array of reflective points, at least two points of the array reflecting an intensity of directly incident sunlight.

11. A system on an orbital vehicle, the system comprising:

an image sensor for capturing images based on incident light;

a light source to illuminate the image sensor;

a shutter that is controllable to allow environmental light to reach the image sensor to prevent the environmental light from reaching the image sensor; and a control system to perform operations comprising:

controlling the shutter to record dark images on the image sensor on-board the orbital vehicle during flight, the dark images including a first image recorded before the orbital vehicle is over a predefined location on the Earth and a second image recorded after the orbital vehicle is over the predefined location on the Earth;

controlling the shutter to record a third image and a fourth image on the image sensor during flight based on illumination from the light source that is on-board the orbital vehicle, the third image being recorded before the orbital vehicle is over the predefined location on the Earth and the fourth image being recorded after the orbital vehicle is over the predefined location on the Earth;

controlling the shutter to record a fifth image on the image sensor during flight while the predefined location on the Earth is visible to the image sensor, the fifth image being based on light from a ground-based calibration system; and calibrating the light source during flight based on the first image, the second image, the third image, the fourth image, and the fifth image.

12. The system of claim 11, wherein the operations comprise:

generating a radiance map for a state of the light source based on the first image, the second image, the third image, the fourth image, and the fifth image.

13. The system of claim 12, wherein operation of the light source is controlled to calibrate the image sensor.

14. The system of claim 11, wherein the orbital vehicle comprises a shutter to open to the environment, and where the light source and the image sensor are behind the shutter; and wherein recording the dark images, the third and fourth images, and the fifth image comprises:

controlling the shutter to close to restrict environmental light from reaching the image sensor;

recording the first image on the image sensor when the shutter is closed and the light source is off;

turning the light source on to illuminate the image sensor when the shutter is closed;

recording the third on the image sensors when the shutter is closed and the light source is illuminated;

turning the light source off;

controlling the shutter to open to allow light from a ground-based calibration system to illuminate the image sensor;

recording the fifth image on the image sensor based on the light from the ground-based calibration system;

controlling the shutter to close to restrict environmental light from reaching the image sensor;

turning the light source on to illuminate the image sensor when the shutter is closed;

recording the fourth image on the image sensor when the shutter is closed and the light source is illuminated;

turning the light source off; and recording the second image on the image sensors when the shutter is closed and the light source is off.

15. The system of claim 11, wherein the light source is among multiple light sources included on the orbital vehicle, where different combinations of the multiple light sources comprise different states; and wherein the operations comprise performing the calibrating for different states that include the light source based on the first image, the second image, the third image, the fourth image, and the fifth image.

16. The system of claim 11, wherein calibrating the light source comprises:

obtaining a dark bias of the light source based on the first and second images;

removing the dark bias from the third, fourth, and fifth images;

performing a calibration analysis of the image sensor based on the fifth image having the dark bias removed to obtain gain coefficients for pixels in the sensor, each gain coefficient for converting a digital number for a pixel into a radiance value;

determining average digital numbers for pixels in the image sensor based on the third and fourth images having the dark bias removed; and applying the gain coefficients to the average digital numbers.

17. The system of claim 11, wherein applying comprises multiplying the gain coefficients by the average digital numbers.

18. The system of claim 11, wherein the dark bias comprises an average dark bias for multiple images.

19. The system of claim 11, wherein the control system is configured to repeat the following operations for two or more different spectral bands of the light:

recording the dark images on the image sensor on-board the orbital vehicle during flight, the dark images including the first and second images;

recording the third and fourth images during flight;

recording the fifth image on the image sensor during flight while the orbital vehicle is over the predefined location on the Earth; and generating the radiance map.

20. The system of claim 11, wherein the ground-based calibration system comprises a plurality of spherical mirrors disposed upon a uniform background as at least one array of reflective points, at least two points of the array reflecting an intensity of directly incident sunlight.

\* \* \* \* \*